(12) United States Patent
Koike et al.

(10) Patent No.: US 7,847,015 B2
(45) Date of Patent: Dec. 7, 2010

(54) COATING COMPOSITION

(75) Inventors: Noriyuki Koike, Takasaki (JP); Yuji Yamane, Annaka (JP); Hirofumi Kishita, Annaka (JP); Koichi Yamaguchi, Takasaki (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 380 days.

(21) Appl. No.: 11/984,175

(22) Filed: Nov. 14, 2007

(65) Prior Publication Data

US 2008/0114120 A1 May 15, 2008

(30) Foreign Application Priority Data

Nov. 15, 2006 (JP) ............... 2006-309528
Nov. 2, 2007 (JP) ............... 2007-286016

(51) Int. Cl.
*C08L 83/00* (2006.01)
*C08G 77/00* (2006.01)
*C08G 77/24* (2006.01)

(52) U.S. Cl. .............. 524/588; 525/474; 528/42
(58) Field of Classification Search .......... 528/42
See application file for complete search history.

(56) References Cited

U.S. PATENT DOCUMENTS

| | | | | |
|---|---|---|---|---|
| 5,101,057 A | * | 3/1992 | Satoh et al. | 556/437 |
| 5,126,420 A | * | 6/1992 | Satoh et al. | 528/32 |
| 5,274,180 A | * | 12/1993 | Masheder | 560/184 |
| 5,290,900 A | * | 3/1994 | Kobayashi | 528/26 |
| 5,314,981 A | * | 5/1994 | Takago et al. | 528/36 |
| 5,660,888 A | | 8/1997 | Grenfell et al. | |
| 5,705,591 A | * | 1/1998 | Matsuda et al. | 528/42 |
| 5,919,886 A | * | 7/1999 | Matsuda et al. | 528/42 |
| 6,020,450 A | * | 2/2000 | Matsuda et al. | 528/42 |
| 6,218,499 B1 | * | 4/2001 | Tarumi et al. | 528/42 |
| 6,613,860 B1 | * | 9/2003 | Dams et al. | 528/36 |
| 2003/0124361 A1 | | 7/2003 | Moore et al. | |
| 2004/0091720 A1 | | 5/2004 | Moore et al. | |

FOREIGN PATENT DOCUMENTS

| | | |
|---|---|---|
| EP | 0 696 627 A1 | 2/1996 |
| EP | 1 059 320 A2 | 12/2000 |
| EP | 1 300 433 A2 | 4/2003 |
| JP | 58-1474484 A | 9/1983 |
| JP | 2-248480 A | 10/1990 |
| JP | 6-184527 A | 7/1994 |
| JP | 6-256756 A | 9/1994 |
| JP | 8-209118 A | 8/1996 |
| JP | 9-137117 A | 5/1997 |
| JP | 10-204421 A | 8/1998 |
| JP | 2000-143991 A | 5/2000 |
| JP | 2002-348370 A | 12/2002 |
| JP | 2005-290323 A | 10/2005 |
| WO | WO-02/30848 A1 | 4/2002 |

* cited by examiner

*Primary Examiner*—Kuo-Liang Peng
*Assistant Examiner*—Robert Loewe
(74) *Attorney, Agent, or Firm*—Birch, Stewart Kolasch & Birch, LLP

(57) ABSTRACT

A coating composition comprising (A) at least one fluorine-containing organosilicon compound represented by the following formula (1) or (2) $Rf^1-QZ^1A_\alpha$ (1) $A_\alpha Z^1Q-Rf^2-(Q-Z^2-Q-Rf^2)_x-QZ^1A_\alpha$ (2) and (B) a fluorine-containing carboxylic acid having a number average molecular weight of from 100 to 10,000 and a fluorine content of at least 25 wt %, wherein an amount of (B) ranges from 0.001 to 10 parts by weight per 100 parts by weight of the component (A) wherein the amount of (B) ranges from 0.001 to 10 parts by weight per 100 parts by weight of the component (A), wherein the composition can be cured rapidly even at room temperature to produce water-repellent and antifouling coatings.

7 Claims, No Drawings

COATING COMPOSITION

CROSS REFERENCES

This application claims benefit of Japanese Patent application No. 2006-309528 filed on Nov. 15, 2006, and Japanese Patent application No. 2007-286016 filed on Nov. 2, 2007, the contents of which are hereby incorporated by reference.

FIELD OF THE INVENTION

The present invention relates to a coating composition which can be cured rapidly to form a coating layer having excellent water- and oil-repellency, and antifouling property.

BACKGROUND OF THE INVENTION

To prevent an article from being fouled with finger prints, sebum, sweat, cosmetics, or food, an antifouling coating is often provided to the article such as lenses of eye glasses or sun glasses, displays of cell phones, personal digital assistants, portable musical players, liquid displays, CRT displays, plasma displays, and EL displays, optical mediums such as compact disks (CD) and digital versatile disks (DVD), and window glass.

Japanese Patent Application Laid-Open, hereinafter abbreviated as "JPA", No. H09-137117, JPA No. 2000-143991 and JPA 2005-290323 describe a method of forming an antifouling coating by applying a perfluoropolyether having an alkoxysilyl group at an end. JPA H02-248480 and H06-184527 describe a method to form an antifouling coating layer comprising a fluoroalkylsilane compound on a glass plate surface. JPA H06-256756 describes a method to form an antifouling coating layer comprising a fluoroalkylsilane compound and a polysiloxane compound on a glass plate surface.

To apply the fluoroalkylsilane and the perfluoropolyether having a terminal alkoxysilyl group, they are usually dissolved in a solvent and then spin-coated on an object. However, due to their high fluorine contents, they are soluble only in limited solvents, mostly fluorinated solvents. Because such solvents are not miscible with water, hydrolysis of the fluoroalkylsilane or the perfluoropolyether is controlled by atmospheric moisture, proceeding slowly.

To solve this problem, JPA No. H10-204421 describes a method of surface reforming comprising the steps of surface-treating with a silane coupling agent having a polar group which agent is soluble in various solvents, and then reacting the polar group with a fluoroalkyl carboxylic acid halide or a perfluoropolyoxyalkyl carboxylic acid halide to fix the fluoroalkyl or perfluoro polyoxyalkyl group to the surface. The method requires two steps, which is troublesome and time-consuming. Further, halides formed in the second step are not desirable from the environmental viewpoint.

To promote hydrolysis of an alkoxysilyl group, a catalyst may be added to a coating composition. Examples of known catalysts for hydrolysis reaction include organic titanate such as tetrabutyl titanate and tetraisopropyl titanate; organic titanium chelate compounds such as titanium diisopropoxy bis (ethylacetoacetate); organic aluminum compounds such as aluminum tris(acetylacetonate) and aluminum tris(ethyl acetoacetate); organic zirconium compounds such as zirconium tetra(acetylacetonate) and zirconium tetrabutylate; organic tin compounds such as dibutyltin dioctoate, dibutyltin dilaurate, dibutyltin di(2-ethylhexanoate), dioctyltin dilaurate, dioctyltin diacetate, and dioctyltin dioctoate; a metal salt of a carboxylic acid such as tin naphthenate, tin oleate, tin butylate, cobalt naphthenate, and zinc stearate; amine compounds and salts thereof such as hexyl amine and dodecyl amine phosphate; quarterly amine salts such as benzyl triethyl ammonium acetate; salts of lower fatty acids such as potassium acetate and lithium nitrate; dialkylhydroxylamine such as dimethylhydroxylamine and diethylhydroxylamine; organosilicon compound having a guanidyl group such as tetramethylguanidylpropyltrimethoxy silane; organic acids such as acetic acid and methanesulfonic acid, and inorganic acid.

However, these catalysts are insoluble or scarcely soluble in fluorinated solvents, so that catalytic efficiency of these catalysts is low. Moreover, metals contained in the catalysts remain in a cured coating layer to cause degradation of the coating layer.

SUMMARY OF THE INVENTION

An object of the present invention is to provide a coating composition which can rapidly form coating layer in a simple process.

After extensive studies, the present inventors have found that the above object can be attained by using a specific carboxylic acid as a catalyst.

The present invention is a coating composition comprising
(A) at least one fluorine-containing organosilicon compound represented by the following formula (1) or (2)

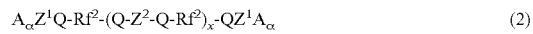

wherein $Rf^1$ is a perfluoroalkyl group or a perfluoroxyalkyl group, $Rf^2$ is a perfluoroxyalkylene group, $Z^1$ is a single bond or a di- to nona-valent organic group containing 1 to 15 silicon atoms, $Z^2$ is a divalent polyorganosiloxylene group having 2 to 100 silicon atoms, Q is a di- to nona-valent group having 2 to 12 carbon atoms and may have an oxygen and/or nitrogen atom, Q in the formula (2) being the same with or different from each other, α is an integer of from 1 to 8, x is an integer of from 0 to 5, and A is a group represented by the following formula

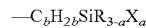

wherein R is a $C_{1-4}$ alkyl group or a phenyl group, X is a hydrolyzable group, a is 2 or 3, and b is an integer of from 0 to 6, and (B) a fluorine-containing carboxylic acid having a number average molecular weight of from 100 to 10,000 and a fluorine content of at least 25 wt %, based on weight of the fluorine-containing carboxylic acid, wherein an amount of the fluorine-containing carboxylic acid ranges from 0.001 to 10 parts by weight per 100 parts by weight of the component (A).

The coating composition of the present invention can be cured rapidly even at room temperature to from a coating which is excellent in water-repellency and adheres strongly to a substrate.

PREFERRED EMBODIMENTS OF THE INVENTION

Component (A)

The component (A) is a fluorine-containing silicon compound represented by the above formula (1) or (2). A mixture of these compounds can be used. In the formulas (1) and (2), $Rf^1$ and $Rf^2$ are fluorine-containing groups. $Rf^1$ is a perfluoroalkyl group or a perfluoroxyalkyl group, and may be branched. Preferably, $Rf^1$ has 2 to 14 carbon atoms. An example of the perfluoroalkyl group is as shown below:

$$CF_3(CF_2)_n-$$

wherein n is an integer of from 1 to 13, preferably from 4 to 10.

An example of the perfluoroxyalkyl group is as shown below:

$$CF_3(C_kF_{2k}O)_m—$$

wherein k is an integer of from 1 to 8, and m is an integer of from 2 to 200. Preferably, $Rf^1$ is represented by the following formula (3), (4) or (5):

$$F(CFCF_2O)_m C_d F_{2d}— \quad (3)$$
$$\quad | \quad$$
$$\quad Y$$

wherein m is an integer of from 2 to 200, d is an integer of from 1 to 3, and Y is a fluorine atom or a $CF_3$ group;

$$CF_3O(CF_2CF_2CF_2O)_m C_d F_{2d}— \quad (4)$$

wherein m is an integer of from 2 to 200, and d is an integer of from 1 to 3;

$$CF_3O(CF_2O)_e(C_2F_4O)_f CF_2— \quad (5)$$

wherein e is an integer of from 0 to 200, f is an integer of from 0 to 200 with e+f ranging from 2 to 200, and repeating units, —$CF_2O$— and —$C_2F_4O$—, may be linked randomly.

$Rf^2$ is a divalent perfluoroxyalkylene group which may be branched. The group may have one or more of the repeating unit represented by the formula, —$C_gF_{2g}O$—, wherein g is an integer of from 1 to 6, so that an example of $Rf^2$ is represented by the formula, —$(C_gF_{2g}O)_h$—, wherein h is an integer of from 1 to 500, preferably 2 to 400, more preferably 10 to 200. Among a plurality of repeating units, g may be different from each other.

Examples of the repeating unit, —$C_gF_{2g}O$—, are as shown below and $Rf^2$ may have a combination of two or more of these units.

—$CF_2O$—

—$CF_2CF_2O$—

—$CF_2CF_2CF_2O$—

—$CF(CF_3)CF_2O$—

—$CF_2CF_2CF_2CF_2O$—

—$CF_2CF_2CF_2CF_2CF_2CF_2O$—

Preferably, $Rf^2$ is represented by the following formula (6), (7) or (8):

$$—C_dF_{2d}(OCF_2CF)_m O(C_rF_{2r}O)_s(CFCF_2O)_n C_dF_{2d}— \quad (6)$$
$$\quad\quad\quad\quad | \quad\quad\quad\quad\quad\quad | \quad$$
$$\quad\quad\quad\quad Y \quad\quad\quad\quad\quad\quad Y$$

wherein Y may be the same with or different from each other and is a fluorine atom or a $CF_3$ group, r is an integer of from 2 to 6, d is an integer of from 1 to 3, m is an integer of from 0 to 200, n is an integer of from 0 to 200 with m+n ranging from 2 to 200, s is an integer of from 0 to 6, and the repeating units, $(C_rF_{2r}O)$, $$—(OCF_2CF)—, \quad —(CFCF_2O)—$$
$$\quad\quad | \quad\quad\quad\quad\quad\quad | \quad$$
$$\quad\quad Y \quad\quad\quad\quad\quad\quad Y$$

may be linked randomly;

$$—C_dF_{2d}(CF_2CF_2CF_2O)_l C_dF_{2d}— \quad (7)$$

wherein l is an integer of from 1 to 200, and d is an integer of from 1 to 3;

$$—C_dF_{2d}(OCF_2CF)_m(OCF_2)_n OC_dF_{2d}— \quad (8)$$
$$\quad\quad\quad\quad | \quad$$
$$\quad\quad\quad\quad Y$$

wherein Y is a fluorine atom or $CF_3$ group, d is an integer of from 1 to 3, m is an integer of from 0 to 200, n is an integer of from 0 to 200 with m+n ranging from 2 to 200, and repeating units, $$—(OCF_2CF)—, \quad (OCF_2)$$
$$\quad\quad | \quad$$
$$\quad\quad Y$$

may be linked randomly.

More preferred $Rf^2$ has repeating units with g ranging from 1 to 4. Preferably, m, p and q range from 1 to 50, most preferably, from 10 to 40.

Q is a group to connect $Rf^1$ with $Z^1$, $Rf^2$ with $Z^2$, and $Rf^2$ with $Z^1$. In the formula (2), Q between $Rf^2$ and $Z^1$, and Q between $Rf^2$ and $Z^2$ may be different from each other. When $Z^1$ is a single bond, Q is directly bonded to A, connecting $Rf^1$ or $Rf^2$ with A. Q is a di- to nona-valent organic group having 2 to 12 carbon atoms and may have an oxygen and/or nitrogen atom. Examples of Q include following groups having a hydrocarbon group, amide, ether, or ester bond:

$$—CH_2O—(CH_2)_n—$$

wherein n is an integer of from 0 to 4;

$$—(CH_2)_n—$$

wherein n is an integer of from 1 to 6;

$$—CH—(CH_2—CH)_n—H$$
$$\quad | \quad\quad\quad\quad | \quad$$

wherein n is an integer of from 1 to 5;

$$\quad\quad O$$
$$\quad\quad \|$$
$$—C—NH—CH_2CH_2CH_2—$$

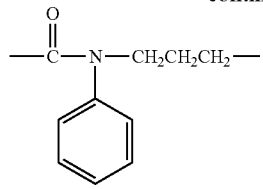
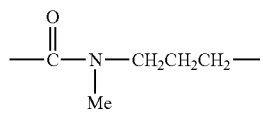
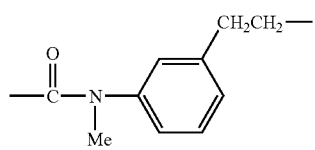
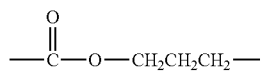
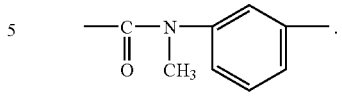
$Z^1$ is a single bond or a di- to nona-valent group having 1 to 15 silicon atoms. As described above, the hydrolyzable group, A, is directly bonded to Q when $Z^1$ is a single bond. Examples of $Z^1$ are as shown below:
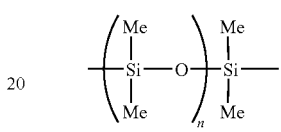
wherein n is an integer of from 0 to 14;
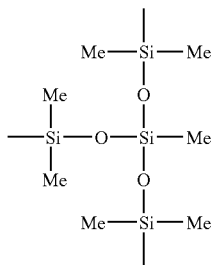
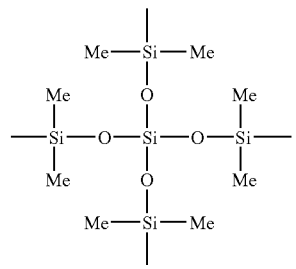
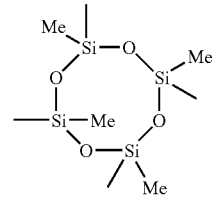
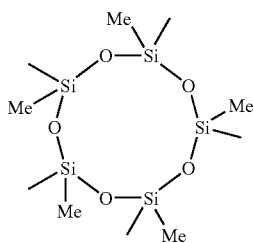
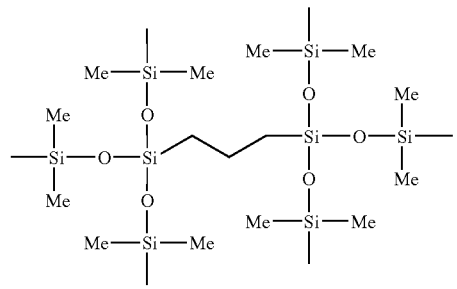
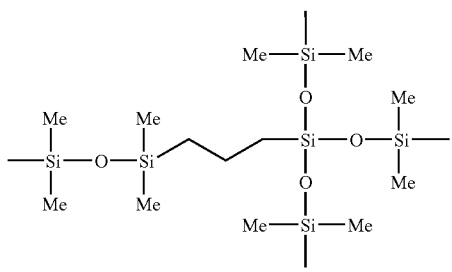

-continued

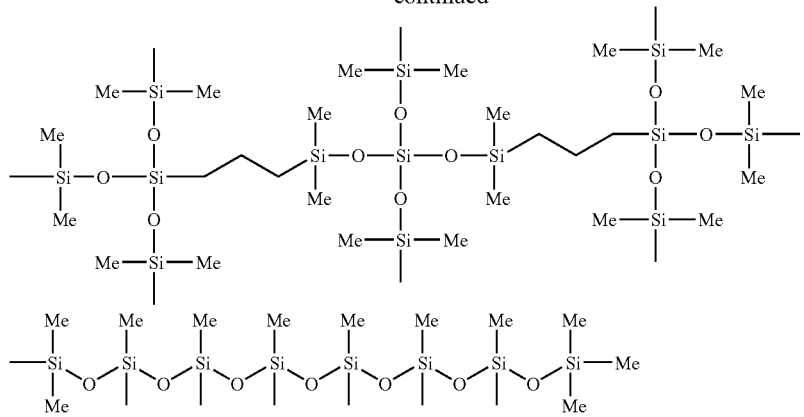

$Z^2$ is a divalent polyorganosiloxylene group having 2 to 100 silicon atoms. Preferably, $Z^2$ is the following linear polyorganosiloxylene group:

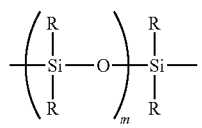

wherein m is an integer of from 1 to 99, preferably from 9 to 49, R may be the same with or different from each other and is a $C_{1-4}$ alkyl, aryl or aralkyl group.

A is a group represented by the following formula:

$$-C_bH_{2b}SiR_{3-a}X_a$$

wherein X is a hydrolyzable group. Examples of X include alkoxy groups having 1 to 10 carbon atoms such as methoxy, ethoxy, propoxy and buthoxy groups; oxyalkoxy groups having 2 to 10 carbon atoms such as methoxymethoxy and methoxyethoxy groups; acyloxy groups having 1 to 10 carbon atoms such as an acetoxy group; alkenyloxy groups having 2 to 10 carbon atoms such as an isopropenoxy group; halogen atoms such as chlorine, bromine, and iodine atoms. Among these, methoxy, ethoxy, iropropenoxy groups and chlorine atom are preferred.

R is an alkyl group having 1 to 4 carbon atoms such as methyl or ethyl group, or a phenyl group, among which a methyl group is preferred; a is 2 or 3, preferably 3, because of higher reactivity and stronger bonding to a substrate and two or three X's may be different from each other; and b is an integer of from 0 to 6, preferably 0, 2 or 3.

The aforesaid fluorine-containing organosilicon compounds can be prepared by the following method.

The fluorine-containing organosilicon compound of the formula (1) can be produced by reacting a compound having an unsaturated group represented by the following formula

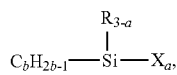

wherein R, X, a and b are as defined above, with an organohydrogenpolysiloxane of the formula, $Z^1H_k$, wherein k is an integer of from 2 to 9, in the presence of an addition reaction catalyst to produce an organohydrogenpolysiloxane with its hydrogen atoms partly substituted with the group, A, and then reacting a fluorine-containing group having an unsaturated group Q' represented by the following formula (i)

$$Rf^1Q' \qquad (i)$$

with the remaining hydrogen atoms of the organohydrogenpolysiloxane having the group A.

In the formula (1), $Rf^1$ is as defined above and Q' is a group having an unsaturated bond as shown below.

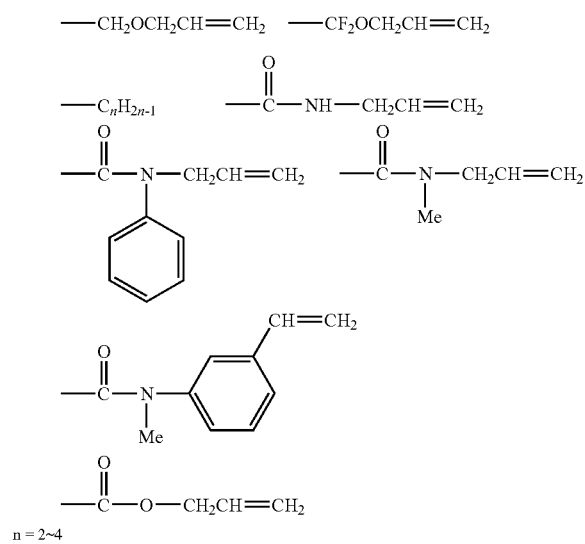

n = 2~4

The fluorine-containing organosilicon compound of the formula (2) can be produced by subjecting an addition-reaction the following compound (ii) having unsaturated bonds at both ends of $R^{f2}$ $$Q'Rf^2Q', \qquad (ii)$$

wherein $Rf^2$ and Q' are as defined above, with an organohydrogenpolysiloxane of the formula, $Z^2H_2$, to produce a compound represented by the following formula $$Q'-Rf^2-(Q-Z^2-Q-Rf^2)_x-Q'$$

and then adding the aforesaid organohydrogenpolysiloxane having the group A to Q'. The addition reaction can be performed according to conventional methods. The addition-reaction to introduce the group A can be performed first.

Component (B)

Component (B) is a fluorine-containing carboxylic acid having a number average molecular weight of from 100 to 10,000, preferably from 200 to 8,000, and a fluorine content of at least 25 wt %, based on weight of the fluorine-containing carboxylic acid. Having a fluorine content of at least 25 wt %, the fluorine-containing carboxylic acid has excellent solubility in fluorinated solvents. In addition, it functions as a water- and oil-repellent agent in a cured layer. Preferably a perfluoroalkyl carboxylic acid and/or a perfluoropolyether carboxylic acid are used.

More preferably, the fluorine-containing carboxylic acid has one or more fluorine atom bonded to α-carbon to which a carboxyl group is bonded. Such a fluorine-containing carboxylic acid has higher catalytic activity.

Preferred examples of the fluorine-containing carboxylic acid are as shown below:

$$CF_3\text{-}(CF_2)_n\text{-}(CH_2)_m\text{COOH}$$

wherein n is an integer of from 0 to 20 and m is 1 or 2;

$$CF_3\text{-}(CF_2)_n\text{COOH}$$

wherein n is an integer of from 0 to 20;

$$HOOC\text{-}(CF_2)\text{-}CF_2\text{—COOH}$$

wherein n is an integer of from 0 to 20;

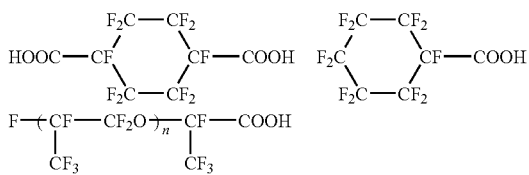

$$F\text{-}(CF\text{—}CF_2O)_n\text{—}CF\text{—COOH}$$
$$\phantom{F\text{-}(}CF_3\phantom{\text{—}CF_2O)_n\text{—}}CF_3$$

wherein n is an integer of from 1 to 200;

$$C_nF_{2n+1}O\text{-}(C_3F_6O)_m\text{C}_2F_4\text{—COOH}$$

wherein n is an integer of from 1 to 10, and m is an integer of from 1 to 100;

$$HOOC\text{—}CF\text{-}(OCF_2\text{—}CF)_l\text{—}O\text{—}C_nF_{2n}\text{—}O\text{-}(CF\text{—}CF_2O)_m\text{—}CF\text{—COOH}$$
$$\phantom{HOOC\text{—}}CF_3\phantom{\text{-}(OCF_2\text{—}}CF_3\phantom{)_l\text{—}O\text{—}C_nF_{2n}\text{—}O\text{-}(}CF_3\phantom{\text{—}CF_2O)_m\text{—}}CF_3$$

wherein l is an integer of from 0 to 100, m is an integer of from 0 to 100, and n is an integer of from 1 to 10;

$$HOOC\text{—}CF_2\text{-}(OCF_2)_m\text{-}(OCF_2)_m\text{-}(OC_2F_4)_nCF_2\text{—COOH}$$

wherein m is an integer of 1 to 200, n is an integer of from 1 to 200, and repeating units, —OCF₂— and —OC₂F₄—, may be linked randomly.

A derivative of the fluorine-containing carboxylic acid can also be used which derivative changes into a corresponding carboxylic acid through a reaction such as hydrolysis when the composition is used. Examples of the derivative include carboxylic acid anhydrides and carboxylic acid esters.

Mixing Ratio of Component (A) with Component (B)

A content of the component (B) in the composition ranges from 0.001 to 10 parts by weight, preferably from 0.05 to 2 parts by weight, per 100 parts by weight of the component (A), depending on desired curing time and a molecular weight of the component (B). If the component (B) is contained less than the aforesaid lower limit, desired catalytic effect is not attained. If the component (B) is contained more than the aforesaid upper limit, it may degrade a cured coating, for example, lowering water-repellency of the coating. Mixing the component (A) with (B) can be performed with a known mixing means. These components may be mixed after each component is dissolved in the after-mentioned solvent.

Solvent

The present coating composition is usually diluted with a fluorinated solvent just before use. It may be diluted beforehand. Preferred examples of the fluorinated solvents include 1,3-bistrifluoromethylbenzene and those represented by the following formulas:

$$C_4F_9OCH_3$$

$$C_4F_9OC_2H_5$$

$$CF_3CF_2CHCl_2$$

$$C_2H_5CF(OCH_3)CF(CF_3)_2$$

These solvents are available under the trade names of Novec HFE-7100, Novec HFE-7200, Novec 7300, Fluorinert FC-77, all from Sumitomo 3M Ltd., and Asahiklin AK-225 from Asahi Glass Co. Ltd. A mixture of two or more of these may be used. A non-fluorinated solvent may be added in an amount not to adversely affect the present invention. Preferably, the fluorinated solvent is used in such an amount that a total weight % of the components (A) and (B), based on total weight of the coating composition, ranges from 0.01 to 1%, preferably from 0.05 to 0.5 wt %.

Method of Application

The coating composition is applied to an object to be surface-treated. The application may be performed by dipping the object in the coating composition and then pulling up the object followed by drying the object. In the applied coating composition, the component (B) catalyzes hydrolysis reaction with atmospheric moisture and condensation reaction, so that a cured coating is formed rapidly. The application may be performed by spraying, brushing, or spin-coating.

Curing of the applied composition can be performed by standing the applied composition at a temperature of from 20 to 35° C. for 15 minutes to 2 hours. The applied composition may be heated at a temperature of 100° C. or lower. The composition can be cured at a relative humidity of from 10 to 90%, with a higher relative humidity preferred.

An object or an article to be treated with the composition may be made of any material such as paper, cloth, metal or an oxide thereof, glass, plastic or ceramic. The treatment with the present composition provides the object with water- and oil-repellency, and antifouling property.

EXAMPLES

The present invention is explained with reference to the following examples, but not limited thereto.

Preparation of Compositions

Coating compositions of Examples and Comparative Examples were prepared by dissolving a fluorine-containing organosilicon compound and a catalyst in a fluorinated solvent, Novec HFE-7200, ex Sumitomo 3M Ltd. at concentrations as shown in Table 1. In each composition obtained, a sheet of a slide glass was dipped and then pulled up to be coated with the composition. The slide glass coated with the composition was left in an environment at a temperature of 25° C. and at a relative humidity of 50%. After 30 minutes from the coating, a water contact angle of the coating layer was measured by a sliding method with a contact angle meter, Model A3, ex Kyowa InterFACE Science Co., Ltd. The results are as shown in Table 1.

In Table 1, A-1 to A-7 are the following fluorine-containing organosilicon compounds.

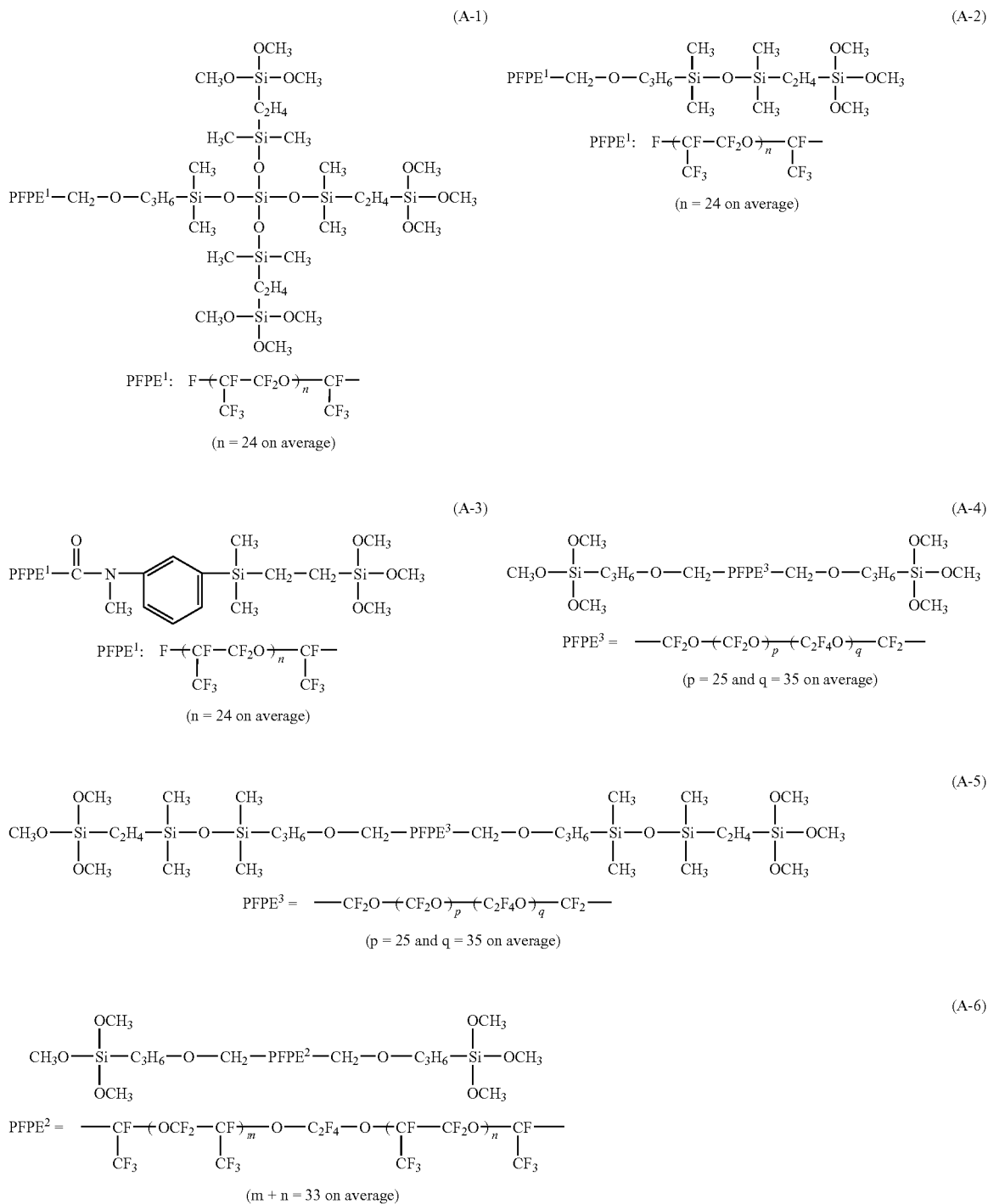

-continued

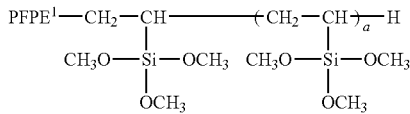

(a = 1.4 on average)

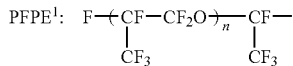

(n = 24 on average)

In Table 1, B-1 to B-6 are the following catalysts.

$CF_3\text{-}(CF_2)_4COOH$    (B-1)

(fluorine content: 66.6 wt %)

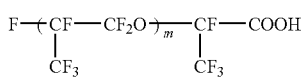

(m=24 on average, fluorine content: 68.2 wt %)

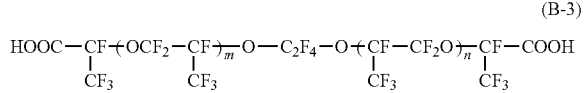

(m+n=33 on average, fluorine content: 67.6 wt %)

$HOOC\text{-}CF_2\text{-}(OCF_2)_p\text{-}(OC_2F_4)_q\text{-}CF_2\text{-}COOH$    (B-4)

(p=25, q=35 on average, fluorine content: 62.4 wt %)

$CH_3\text{-}COOH$    (B-5)

$C_3H_7\text{-}COOH$    (B-6)

TABLE 1

| | Fluorine-containing organosilicon wt % | Catalyst | ppm | Water contact angle after 30 min., degree |
|---|---|---|---|---|
| Example 1 | A-1 | 0.3 | B-2 | 30 | 116 |
| Example 2 | A-2 | 0.3 | B-2 | 30 | 117 |
| Example 3 | A-2 | 0.3 | B-1 | 5 | 117 |
| Example 4 | A-2 | 0.3 | B-3 | 15 | 116 |
| Example 5 | A-3 | 0.3 | B-2 | 30 | 115 |
| Example 6 | A-4 | 0.3 | B-4 | 30 | 106 |
| Example 7 | A-5 | 0.3 | B-4 | 10 | 105 |
| Example 8 | A-6 | 0.3 | B-3 | 15 | 104 |
| Example 9 | A-7 | 0.3 | B-4 | 30 | 116 |
| Comparative Example 1 | A-2 | 0.3 | B-5 | 100 | 82 |
| Comparative Example 2 | A-2 | 0.3 | B-6 | 150 | 85 | as is Evident from Table 1, the Composition Comprising the catalyst B-1, B-2, B-3 or B-4 showed significantly larger contact angle than those comprising B-5 or B-6. This indicates that the compositions of Examples are sufficiently cured even in 30 minutes, whereas the compositions of Comparative Examples are not. The present composition is thus very useful for coating applications where rapid curing at low temperature is desired.

The invention claimed is:

1. A coating composition comprising
   (A) at least one fluorine-containing organosilicon compound represented by the following formula (1) or (2)

$Rf^2\text{-}QZ^1A_\alpha$    (1)

$A_\alpha Z^1\text{-}Q\text{-}Rf^2\text{-}(Q\text{-}Z^2\text{-}Q\text{-}Rf^2)_x\text{-}QZ^2A_\alpha$    (2)

wherein $Rf^1$ is a perfluoroalkyl group or a perfluoroxyalkyl group,
   $Rf^2$ is a perfluoroxyalkylene group,
   $Z^1$ is a single bond or a di- to nona-valent organic group having 1 to 15 silicon atoms,
   $Z^2$ is a divalent polyorganosiloxylene group having 2 to 100 silicon atoms,
   Q is a di- to nona-valent group having 2 to 12 carbon atoms and may have an oxygen and/or nitrogen atom, Q in the formula (2) being the same with or different from each other,
   α is an integer of from 1 to 8, x is an integer of from 0 to 5, and A is a group represented by the following formula $-C_bH_{2b}SiR_{3-a}X_a$ wherein R is a $C_{1-4}$ alkyl group or a phenyl group, X is a hydrolyzable group, a is 2 or 3, and b is an integer of from 0 to 6,
   (B) a fluorine-containing carboxylic acid having a number average molecular weight of from 100 to 10,000 and a fluorine content of at least 25 wt %, based on weight of the fluorine-containing carboxylic acid, wherein an amount of the fluorine-containing carboxylic acid ranges from 0.001 to 10 parts by weight per 100 parts by weight of the component (A), and
   (C) a solvent consisting of a fluorinated solvent in such an amount that total wt % of the components (A) and (B), based on total weight of the coating composition, ranges from 0.01 to 1 wt %.

2. The coating composition according to claim 1, wherein the component (B) is a perfluoroalkyl carboxylic acid or a perfluoropolyether carboxylic acid.

3. The coating composition according to claim 1, wherein the component (B) is represented by any one of the following formulas:

$CF_3\text{-}(CF_2)_n COOH$ wherein n is an integer of from 0 to 20;

$HOOC\text{-}(CF_2)_n CF_2\text{-}COOH$ wherein n is an integer of from 0 to 20;

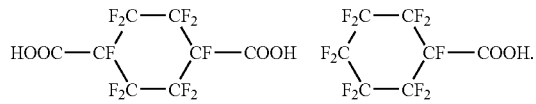

4. The coating composition according to claim 1, wherein the component (B) is represented by any one of the following formulas:

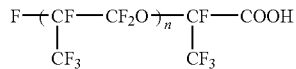

wherein n is an integer of from 1 to 200;

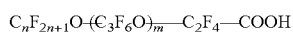

wherein n is an integer of from 1 to 10, and m is an integer of from 1 to 100;

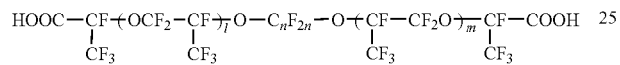

wherein l is an integer of from 0 to 100, m is an integer of from 0 to 100, and n is an integer of from 1 to 10;

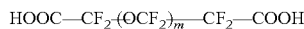

wherein m is an integer of 1 to 200, n is an integer of from 1 to 200, and the repeating units, —OCF$_2$— and —OC$_2$F$_4$—, may be linked randomly.

5. The coating composition according to claim 1, wherein Rf$^1$ in the formula (1) is represented by the following formula (3), (4) or (5):

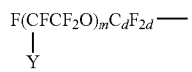

wherein m is an integer of from 2 to 200, d is an integer of from 1 to 3, and Y is a fluorine atom or CF$_3$ group;

wherein m is an integer of from 2 to 200, and d is an integer of from 1 to 3;

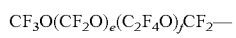

wherein e is an integer of from 0 to 200, f is an integer of from 0 to 200 with e+f ranging from 2 to 200, and the repeating units, —CF$_2$O— and —C$_2$F$_4$O—, may be linked randomly.

6. The coating composition according to claim 1, wherein Rf$^2$ in the formula (2) is represented by the following formula (6), (7) or (8):

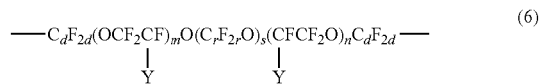

wherein Y may be the same with or different from each other and is a fluorine atom or a CF$_3$ group, r is an integer of from 2 to 6, d is an integer of from 1 to 3, m is an integer of from 0 to 200, n is an integer of from 0 to 200 with m+n ranging from 2 to 200, s is an integer of from 0 to 6, and the repeating units may be linked randomly;

wherein l is an integer of from 1 to 200, and d is an integer of from 1 to 3;

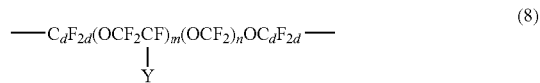

wherein Y is a fluorine atom or a CF$_3$ group, d is an integer of from 1 to 3, m is an integer of from 0 to 200, n is an integer of from 0 to 200 with m+n ranging from 2 to 200, and the repeating units may be linked randomly.

7. A coating composition consisting of:
(A) at least one fluorine-containing organosilicon compound represented by the following formula (1) or (2)

$$Rf^1\text{-}QZ^1A_\alpha \quad (1)$$

$$A_\alpha Z^1 Q\text{-}Rf^2\text{-}(Q\text{-}Z^2\text{-}Q\text{-}Rf^2)_x\text{-}QZ^1 A_\alpha \quad (2)$$

wherein Rf$^1$ is a perfluoroalkyl group or a perfluoroxyalkyl group,
Rf$^2$ is a perfluoroxyalkylene group,
Z$^1$ is a single bond or a di- to nona-valent organic group having 1 to 15 silicon atoms,
Z$^2$ is a divalent polyorganosiloxylene group having 2 to 100 silicon atoms,
Q is a di- to nona-valent group having 2 to 12 carbon atoms and may have an oxygen and/or nitrogen atom, Q in the formula (2) being the same with or different from each other,
α is an integer of from 1 to 8, x is an integer of from 0 to 5, and A is a group represented by the following formula

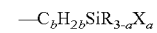

wherein R is a C$_{1-4}$ alkyl group or a phenyl group, X is a hydrolyzable group, a is 2 or 3, and b is an integer of from 0 to 6,
(B) a fluorine-containing carboxylic acid having a number average molecular weight of from 100 to 10,000 and a fluorine content of at least 25 wt %, based on weight of the fluorine-containing carboxylic acid, wherein an amount of the fluorine-containing carboxylic acid ranges from 0.001 to 10 parts by weight per 100 parts by weight of the component (A), and
(C) a fluorinated solvent in such an amount that total wt % of the components (A) and (B), based on total weight of the coating composition, ranges from 0.01 to 1 wt %.

* * * * *